April 5, 1960   J. D. EDWARDS   2,931,352
VERTICAL GAS BROILER
Filed May 24, 1957   3 Sheets-Sheet 1
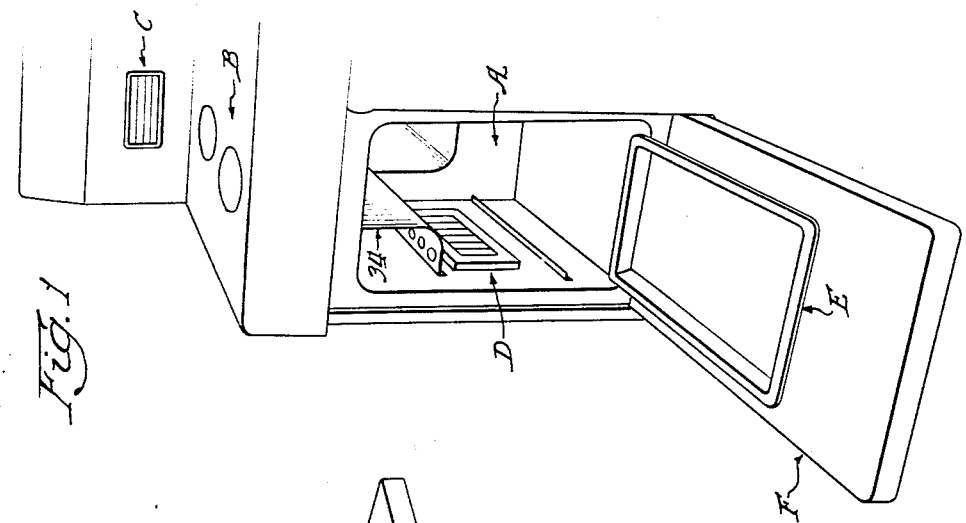
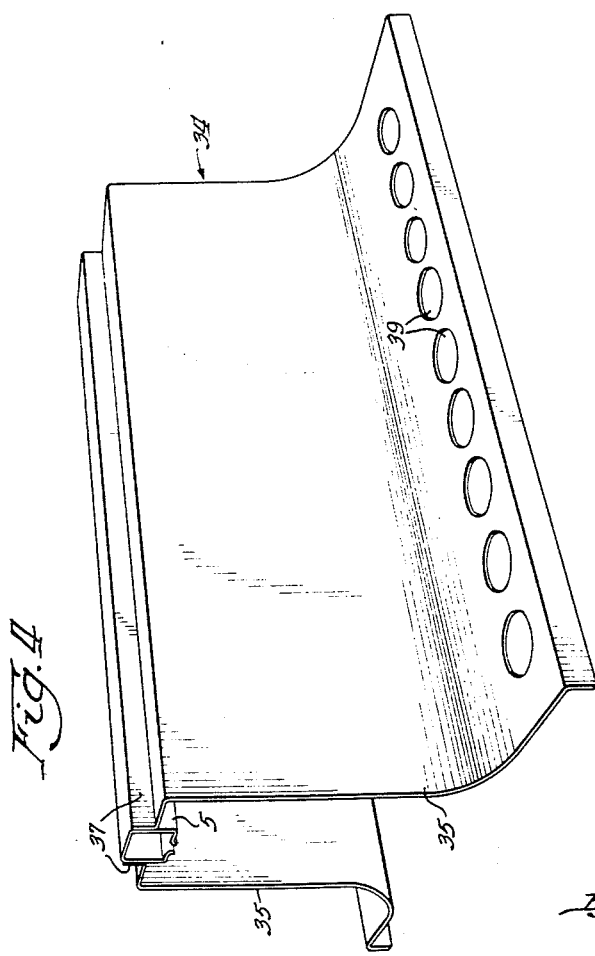
Inventor:
James D. Edwards
By: H. J. Schmid
Atty.

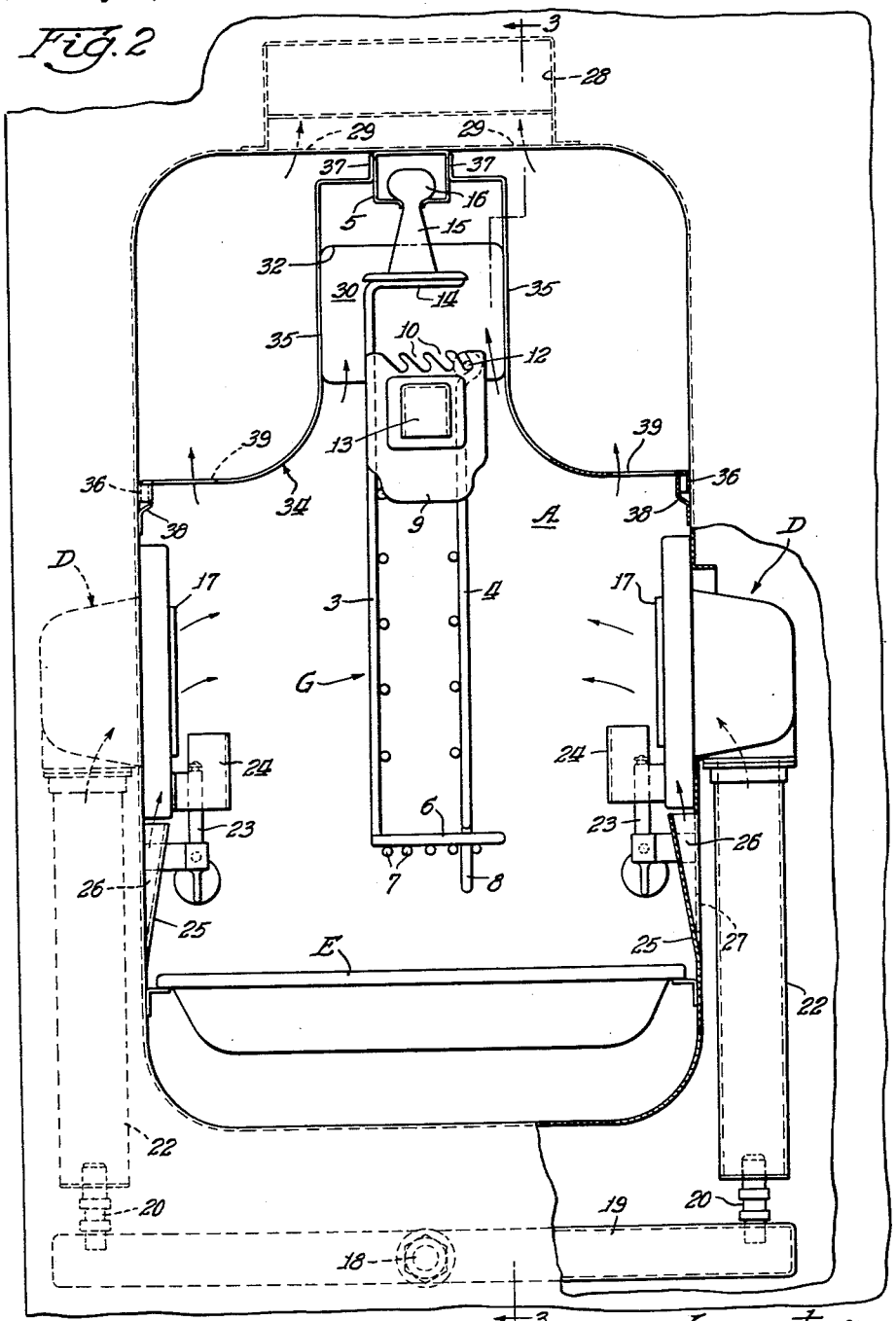

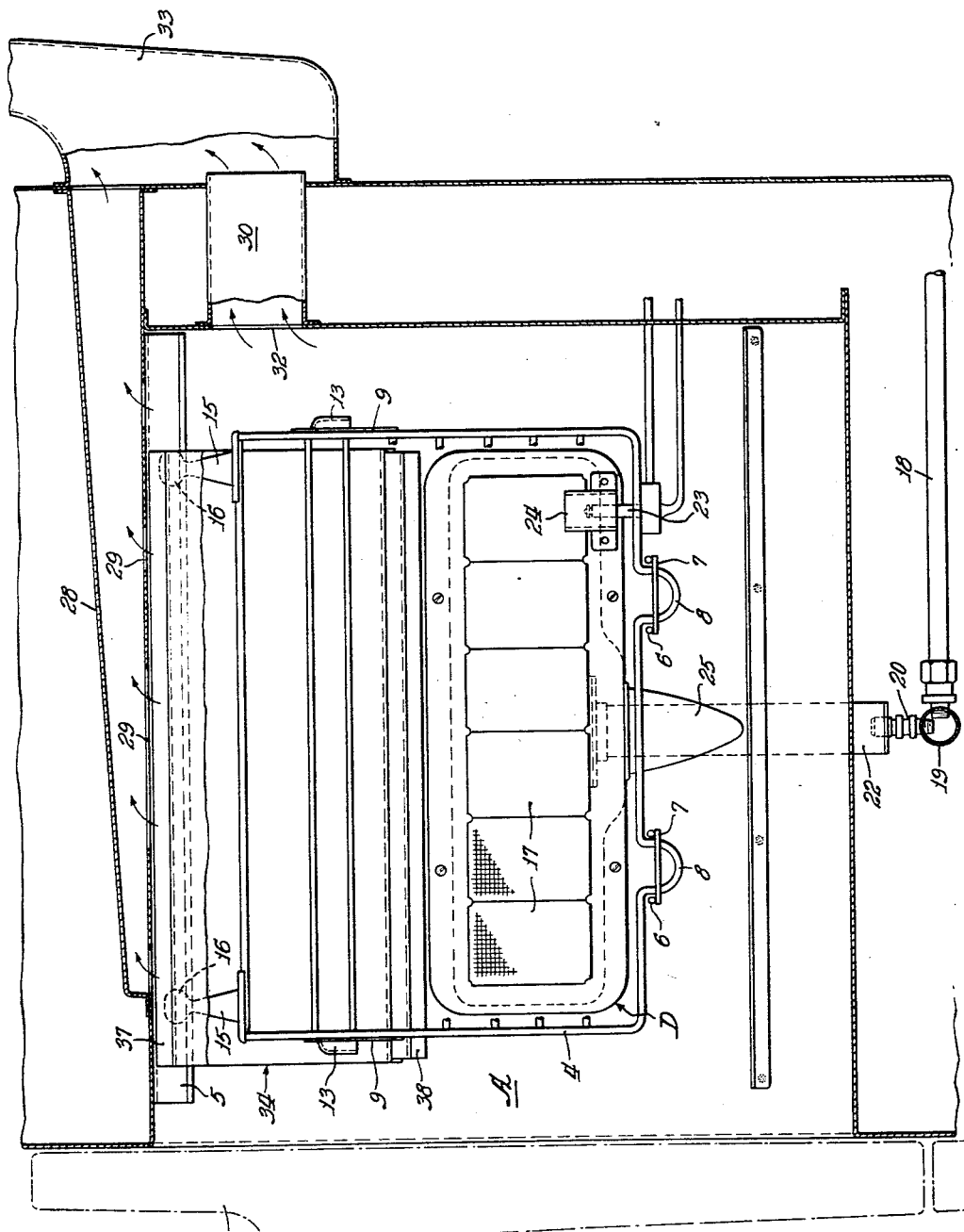

United States Patent Office 2,931,352
Patented Apr. 5, 1960

1

2,931,352

VERTICAL GAS BROILER

James D. Edwards, Effingham, Ill., assignor to Borg-Warner Corporation, Chicago, Ill., a corporation of Illinois Application May 24, 1957, Serial No. 661,391

1 Claim. (Cl. 126—41)

This invention relates to gas cooking stoves and more particularly to a vertical broiler for a gas stove utilizing a radiant-type gas burner.

In U.S. application, Serial No. 513,994, filed June 8, 1955, now Patent No. 2,868,111, and of common ownership, there is disclosed a vertical broiler for a cooking stove which comprises, in general, a broiler compartment having a meat rack supported vertically between two electric heating elements. The importance of proper heat venting of the broiler compartment is brought out in said application and, while the venting means has been found to be quite efficient for such broiler, the particularly disclosed vent means is not satisfactory when radiant gas burners are substituted for the electrical heating elements. When using radiant gas burners a considerable amount of live or convection heat is also produced, and this live heat collects in the upper area of the broiler compartment and becomes so intense that the upper portion of the meat in the vertical rack is charred.

It is an object of the present invention to provide an improved radiant-type gas vertical broiler unit for a cooking range which will eliminate any charring of the meat in the broiler. In this respect, it is a more particular object of the invention to protect the upper portion of the meat disposed in a vertical broiler by venting the live, convection heat away from the upper portion of the meat.

The invention consists of the novel constructions, arrangements and devices to be hereinafter described and claimed for carrying out the above stated objects and such other objects as will be apparent from the following description of a preferred embodiment of the invention, illustrated with reference to the accompanying drawings, wherein:

Fig. 1 is a fragmentary perspective view of one end of a gas cooking range and showing the broiler compartment of the present invention;

Fig. 2 is a fragmentary sectional elevational view of the front of the broiler compartment;

Fig. 3 is a fragmentary sectional side elevational view of the broiler compartment taken on line 3—3 of Fig. 2 and showing the venting means; and Fig. 4 is a perspective view of a baffle which forms a part of the broiler.

Referring now to the drawings, there is shown fragmentarily in Fig. 1, the left hand side of a gas cooking range with which the present invention is associated. That portion of the range disclosed comprises the broiler compartment A, top burners B, a vent C, broiler burners D, a drip pan E and a door F.

Referring to Figs. 2 and 3, an adjustable meat rack G is vertically disposed between the gas burners D. The rack G is made of wire or suitable metallic bar stock and comprises two grids 3 and 4 suitably supported to the top wall of the oven compartment A by channel member 5. The grid 3 is formed at the bottom thereof with two inwardly extending arms 6, each having a plurality of spaced transverse members 7 secured thereto. The grid 4 is provided with two U-shaped projections 8 at the bottom thereof and each projection is insertable into the spaces between the transverse members 7 of the arms 6. A plate 9 having a plurality of notches 10 therein is attached to the grid 3 near the top thereof and each of the notches 10 corresponds to a space between the transverse members 7 at the bottom of the grid. A wire member 12 of the grid 4 is adapted to rest in a selected notch 10 of the plate 9. By selecting the proper space in the members 6 for inserting the members 8 and by placing the wire member 12 in a corresponding notch 10, the food rack G is adjustable to different thicknesses of meat placed therein. The plate 9 has an offset plate 13 for receiving a detachable handle (not shown).

The grid 3 has an inwardly extending portion 14 at the top thereof on which two hangers 15 are attached. The hangers 15 each have a cylindrical-shaped extension 16 thereon for sliding engagement in the channel member 5 for supporting the rack G. The rack G is thus removably supported by the channel member 5.

The burners D are radiant heaters comprising a plurality of perforated ceramic plates 17. The burners D are of the type shown in U.S. Patent No. 2,244,045, June 3, 1941. The ceramic plates 17, of which there are six on each burner of the present broiler, have a multiplicity of tiny openings therein providing an even blanket of intense radiant heat. It has been found that the present burners have excellent heat radiating characteristics and are very effective as broiler heaters. Gas is supplied to the burners D from aluminum tubing 18 connected to the range manifold pipe (not shown). The tubing 18 is connected to a manifold 19 which has a mixer pin 20 at either end thereof. The mixer pins 20 supply gas to two venturi tubes 22 in which the gas is mixed with primary air entering the space between the tubes 22 and the mixer pins 20 to form the combustible gaseous mixture for the burners D. Each burner D is provided with a pilot 23 protected by a shield 24.

Means are provided for admitting secondary combustion air to the burners D. As seen in Figs. 2 and 3, the side walls of the compartment A have inturned portions 25 having openings 26 therein communicating the exterior of the compartment A with the interior thereof immediately below the burners D where the tubes 22 are connected to the burners. Additional air is supplied to the compartment A through a pair of openings 27 disposed above the drip pan E and below the burners D on either side of the inturned portion 25 on the right side of the broiler as seen in Fig. 2.

The broiler compartment is vented by means of a horizontal vent 28, Fig. 3, in communication with a plurality of openings 29 in the top wall of the broiler compartment A. Another vent 30 is in communication with an opening 32 in the back wall of the compartment A. The vents 28 and 29 are in communication with a common stack 33 which in turn communicates with the vent C.

Extensive broiling tests were made in the broiler thus far described and it was invariably found that the lower and middle portions of the meat were broiled to perfection by the radiant burners D. However, it was also invariably found that the upper portion of the meat was charred and inedible due to live, convection heat collecting in the upper regions of the broiler compartment A. In order to keep this live heat away from the upper portion of the meat so that it can be cooked by radiant heat from the burners D, a baffle or shield 34 is provided on each side of the rack G to trap the live heat away from the meat. Each shield 34 comprises a substantially L-shaped sheet metal member 35 having a depending lip 36 at the bottom thereof and an upstanding lip 37 at the top thereof. The shields 34 are removable from the compartment A for cleaning purposes and are supported by brackets 38 secured to the side walls of the compartment. The brackets 38 slidably receive the lips 36 of the shields 34. When the shields are inserted into the compartment the upstanding lips 37 rest against the sides of the channel member 5. A plurality of openings 39 are provided in each shield on the bottom portion thereof adjacent the depending lips 36.

In operation, the burners D are lighted and a steak or the like is placed in the meat rack G. If desired, a small quantity of water may be placed in the pan E to provide a layer of moisture between the meat and the burners and also to catch the fat that drips from the steak as it is being cooked to prevent burning of the fat. As will be recalled, air enters the compartment by three paths; through the tubes 22, the opening 26, and through the openings 27 and is expelled therefrom through the vents 28 and 30. As the steak is broiled by the radiant heat from the burners D, any live heat produced in the compartment A passes either through the vent 30 or through the plurality of openings 39 in the shields 34, through the openings 29 in the top of the compartment and into the vent 28. The live heat is thus trapped away from the meat in the rack G so that all of the meat is cooked by radiant heat and charring of the upper portion of meat in the rack G is prevented.

While I have described my invention in connection with one specific embodiment thereof, it is to be understood that this is by way of illustration and not by way of limitation and the scope of my invention is defined solely by the appended claim which should be construed as broadly as the prior art will permit.

I claim:

A gas broiler for cooking food comprising a housing having an air inlet and a flue outlet, the top of said housing having a plurality of openings therein to provide communication between the interior of said housing and said flue outlet, a pair of radiant gas burners suspended on opposite interior side walls of said housing, a vertically disposed rack suspended within said housing between said radiant burners and adapted to contain meat to be broiled, the upper portion of said rack extending above the upper level of said burners, and a pair of L-shaped baffles disposed within the upper corners of said housing above said radiant burners and having the vertical portions thereof disposed adjacent the upper portion of said rack, said baffles each being provided with a plurality of openings in the horizontal portions thereof and above said burners to permit live heat to pass directly from a position adjacent said radiant burners through the openings formed in the top of the housing and to said flue outlet and thus move the live heat away from the upper portion of said rack.

References Cited in the file of this patent

UNITED STATES PATENTS

| | | |
|---|---|---|
| 521,718 | Koll | June 19, 1894 |
| 2,071,234 | Merrill | Feb. 16, 1937 |